United States Patent [19]
Short et al.

[11] Patent Number: 6,130,892
[45] Date of Patent: Oct. 10, 2000

[54] NOMADIC TRANSLATOR OR ROUTER

[75] Inventors: Joel E. Short; Leonard Kleinrock, both of Los Angeles, Calif.

[73] Assignee: Nomadix, Inc., Westlake Village, Calif.

[21] Appl. No.: 09/041,534

[22] Filed: Mar. 12, 1998

Related U.S. Application Data

[63] Continuation-in-part of application No. 08/816,174, Mar. 12, 1997, abandoned.

[51] Int. Cl.$^7$ .................................. H04L 12/56; H04J 3/16
[52] U.S. Cl. ............................ 370/401; 370/338; 370/466
[58] Field of Search ..................................... 370/338, 389, 370/390, 392, 393, 395, 397, 400, 401, 402, 404, 406, 409, 465, 463, 466, 467, 350, 252, 254, 255, 408; 455/432, 433, 456; 340/825.07, 825.2, 825.21; 709/220, 221, 222, 223, 219, 226, 229, 230, 245

[56] References Cited

U.S. PATENT DOCUMENTS

| | | | |
|---|---|---|---|
| 5,159,592 | 10/1992 | Perkins | 370/338 |
| 5,309,437 | 5/1994 | Perlman | 370/408 |
| 5,371,852 | 12/1994 | Attanasio | 370/402 |
| 5,412,654 | 5/1995 | Perkins | 370/338 |
| 5,557,748 | 9/1996 | Norris | 709/219 |
| 5,586,269 | 12/1996 | Kubo . | |
| 5,636,216 | 6/1997 | Fox et al. | 370/402 |
| 5,708,655 | 1/1998 | Toth et al. | 370/313 |
| 5,751,971 | 5/1998 | Dobbins | 709/225 |
| 5,781,552 | 7/1998 | Hashimoto | 370/447 |
| 5,790,541 | 8/1998 | Patrick et al. | 370/392 |
| 5,793,763 | 8/1998 | Mayes et al. | 370/389 |
| 5,798,706 | 8/1998 | Kraemer et al. | 370/401 |
| 5,841,769 | 11/1998 | Okanoue et al. | 370/338 |
| 5,854,901 | 1/1999 | Cole | 709/222 |
| 5,862,345 | 1/1999 | Okanoue et al. | 370/312 |
| 5,909,549 | 6/1999 | Complement | 709/223 |
| 5,915,119 | 6/1999 | Cone | 709/223 |
| 5,918,016 | 7/1999 | Brewer | 709/220 |
| 5,920,699 | 7/1999 | Bare | 709/223 |
| 6,006,272 | 12/1999 | Aravamudan et al. | 709/245 |
| 6,012,088 | 2/2000 | Li et al. | 709/219 |

OTHER PUBLICATIONS

Egevang, IP Network Address Translator, Network Working Group RFC 1631, pp. 1–10, May 1994.

Joel E. Short; "Auto–Porting and Rapid Protyping with Application to Wireless and Nomadic Network Algorithms, A dissertation submitted in partial satisfaction of the requirements for the degree of Doctor of Philosophy in Computer Science," University of California, Los Angeles; Published Oct. 26, 1996; pp. xv, 118–124; Copyright Jan. 16, 1997.

*Primary Examiner*—Ricky Ngo
*Assistant Examiner*—Steven Nguyen
*Attorney, Agent, or Firm*—Brooks & Kushman P.C.

[57] ABSTRACT

A nomadic router or translator enables a laptop computer or other portable terminal which is configured to be connected to a home network to be connected to any location on the internet or other digital data communication system. The router automatically and transparently re-configures the terminal to its new location and processes outgoing and incoming data. The router includes a processor which appears as the home network to the terminal, and appears as the terminal to the communication system. The terminal has a permanent address, the router has a router or translator address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address. Alternatively, the terminal can be directly connected to a point on a local network, and the router connected to another point on the network. The router can be employed to implement numerous applications including nomadic e-mail, network file synchronizer, database synchronizer, instant network, nomadic internet and trade show router and can also be utilized as a fixed nomadic router.

8 Claims, 10 Drawing Sheets

NOMADIC TRANSLATOR OR ROUTER

CROSS-REFERENCE TO RELATED APPLICATION

This application is a continuation-in-part of U.S. patent application Ser. No. 08/816,174, entitled "NOMADIC ROUTER", filed Mar. 12, 1997, by Joel E. Short et al, now abandoned.

STATEMENT REGARDING FEDERALLY SPONSORED RESEARCH OR DEVELOPMENT

The U.S. government may have rights in this invention as provided for by the terms of Contract No. DAAH01-97-C-R179 awarded by DARPA.

TECHNICAL FIELD

The present invention generally relates to the art of digital communications, and more specifically to a portable translator or router which enables a user digital communication terminal to be location and device transparent.

BACKGROUND ART

User digital communication addresses such as internet or IP addresses are conventionally associated with a fixed physical location, such as a user's business telephone line. However, portable communication devices such as laptop computers are becoming increasingly popular, and it is common for a user to access the internet from locations as diverse as hotel rooms and airplanes.

Digital communication networks are set up to route communications addressed to a communication address to the associated physical location. Thus, if a laptop computer is connected to a remote location, communications to and from the computer will not be associated with the user's communication address.

In order for a computer (host) to communicate across a network (e.g., the internet), software protocols (e.g., Transport Control Protocol/Internet Protocol (TCP/IP)) must be loaded into the host. A host computer sends information (i.e., packets of data) to devices on the network (routers) which receive the packets and send the packets back to the destination host.

The destination host will route replies back using a similar process. Each host computer and router must be configured so it will know who to send the packets of data to. A router will receive the packets only if the host computers specifically send (address) the packets to that router. If a host is configured incorrectly (bad address), then the host computer and router will be unable to communicate.

With the advent of mobile computers (laptops) and the desire to plug them into various networks to gain access to the resources on the network and internet, a mobile computer must be configured for each network it plugs into. Traditionally this new configuration can be done either (i) manually in software on the mobile computer (usually causing the mobile computer to be restarted to load in the new configuration), or (ii) with a new set of protocols which must be utilized on the mobile computer to obtain the configuration information from a device on the network to which the computer is being connected. When new services (protocols) are created to add functionality to the host computers, these new protocols must be updated in the host computers or routers, depending upon the type of new functionality being added.

DISCLOSURE OF INVENTION

In accordance with the present invention, a portable "Nomadic" router or translator enables a laptop computer or other portable terminal which is configured to be connected to a local home network to be connected to any location on the internet or other digital data communication system. The nomadic router automatically and transparently re-configures the terminal to its new location and processes outgoing and incoming data.

The nomadic router includes a processor which appears as the home network to the terminal, and appears as the terminal to the communication system. The terminal has a permanent address, the nomadic router has a router address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address.

The terminal can be directly connected to a point on a local network, and the nomadic router connected to another point on the network. The nomadic router can be employed to implement numerous applications including nomadic e-mail, network file synchronizer, database synchronizer, instant network, nomadic internet, mobile virtual private network and trade show router, and can also be utilized as a fixed nomadic router.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router also automatically configures the terminal to utilize a selected one of the interface devices, and switches from one to another if the first device malfunctions or becomes otherwise unavailable.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the users switches when in the office, moving around the office, or on the road (such as at a hotel, airport, or home). The device transparency in the nomadic router provides seamless switching among these devices (easily, transparently, intelligently, and without session loss). The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards which need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router even when the host computer is not configured to communicate with the nomadic router.

This is achieved by the nomadic router pretending to be the router which the host is configured for, and by the nomadic router pretending to be the host which the router expects to communicate with. Therefore, the nomadic router supports the mobility of computers in that it enables these computers to plug into the network at different locations (location independence) without having to install, configure, or utilize any new protocols on the mobile computer.

The mobile computer continues to operate without being aware of the change in location or new configuration, and the nomadic router translates the data allowing the host to think that it is communicating with the router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the network infrastructure so it will already be there when the mobile computer user arrives (e.g., a box which plugs into the local area network translating packets being sent between the host and nomadic router, or a chip which is installed in routers on the network). The nomadic router can also be provided in the form of software which is loaded and executed in the mobile computer or another computer or router on a network.

These and other features and advantages of the present invention will be apparent to those skilled in the art from the following detailed description, taken together with the accompanying drawings, in which like reference numerals refer to like parts.

MODE(S) FOR CARRYING OUT THE INVENTION

Figure 1:
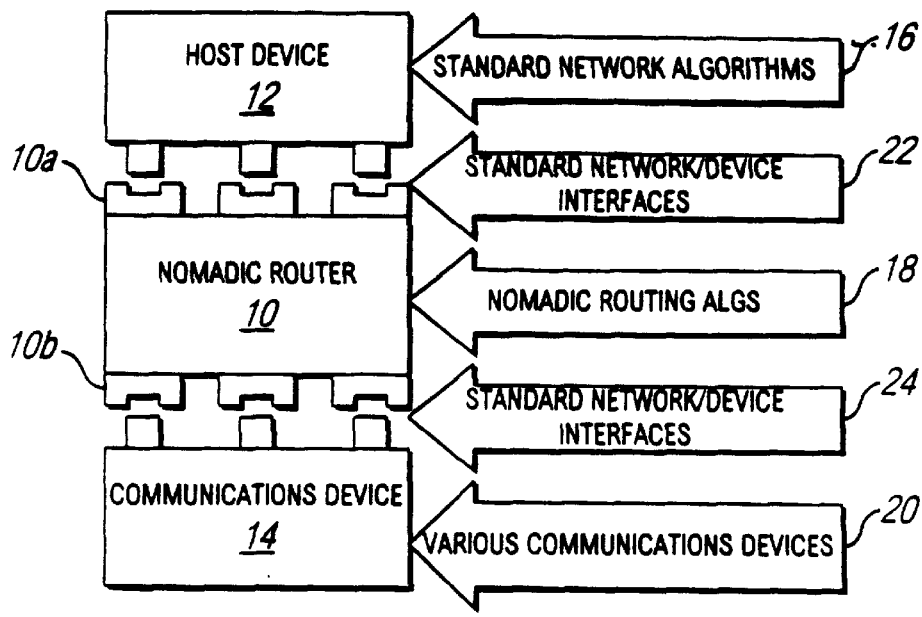
FIG. 1 is a diagram illustrating the implementation of the present nomadic router between the host computing device and various communication devices through standard interfaces.

Basic Nomadic Router
Well-defined Standard Interfaces:

FIG. 1 illustrates a "Nomadic" translator or router 10 embodying the present invention as being connected between a host device or computer 12 and a communications device 14. The host device 12 is a laptop computer or other fixed or mobile digital data communication terminal which is sufficiently portable or mobile that it can be carried from one location to another. A laptop computer, for example, can be used in any convenient location such as an airplane, customer's office, home, etc.

The communications device 14 can be part of any type of communication system to which the host computer 12 can be connected. Such communication systems include, but are not limited to, local networks, wide area networks, dial-up and direct internet connections, etc. In a typical application, the communications device will connect the host computer to a local network which itself is connected to the internet. Thus, the host device 12 is able to communicate with an unlimited number of networks and nodes which are themselves interconnected with routers, switches, bridges, etc. in any known manner.

The present router 10 includes a terminal interface 10a which normally is used to connect the router 10 to the host device 12, and a system interface 10b which connects the router 10 to the communications device 14. As will be further described below, the router 10 generally includes a processor consisting of hardware and/or software which implements the required functionality. The router 10 is further configured to operate in an alternate mode in which the host device 12 is connected directly to a network, and the router 10 is also connected to a point in the network via the system interface 10b. In this case, the terminal interface 10as is unused.

Although the device 10 is described herein as being a router, it will be understood that the router 10 is not a conventional router in that it includes the capability for providing interconnectability between networks. Instead, the present router 10 is essentially a translator which enables the host device 12 to be automatically and transparently connected to any communications device 14, and process incoming and outgoing data for the device 12.

The host device 12 is provided with a permanent internet address which is conveniently not changed in accordance with the present invention. The device 12 is also initially configured to communicate with a particular gateway or other home device at its base location. The gateway has a home address which the device 12 attempts to locate when it is connected to any communication system. Without the functionality of the present nomadic router 10, the host device 12 would not be able to operate at a remote location because it would not find its gateway.

It will be understood that the term "home" does not relate to a residence, but is the network, gateway or other communication device or system to which the terminal is normally connected and which corresponds to the home internet or IP address.

FIG. 1 further illustrates a top protocol layer 16 representing the host computing device 12 which generates and consumes data that is transferred through the communications device 14. This interface 16 is done just below the IP layer, and above the link layer in the typical OSI/ISO model. In the middle is a layer 18 which represents the router 10 and whose function it is to adaptively configure and utilize the underlying communications device and provide the router support described herein. A lower layer 20 is a physical communication which carries out the communication (potentially wire-lined Internet based, ad-hoc or wireless) as made available and determined for use by the nomadic router or user. Between the router layer 18 and the layers 16 and 20 are interfaces 22 and 24 which the router 10 identifies and configures dynamically.

Figures 7A, 7B, 7C:
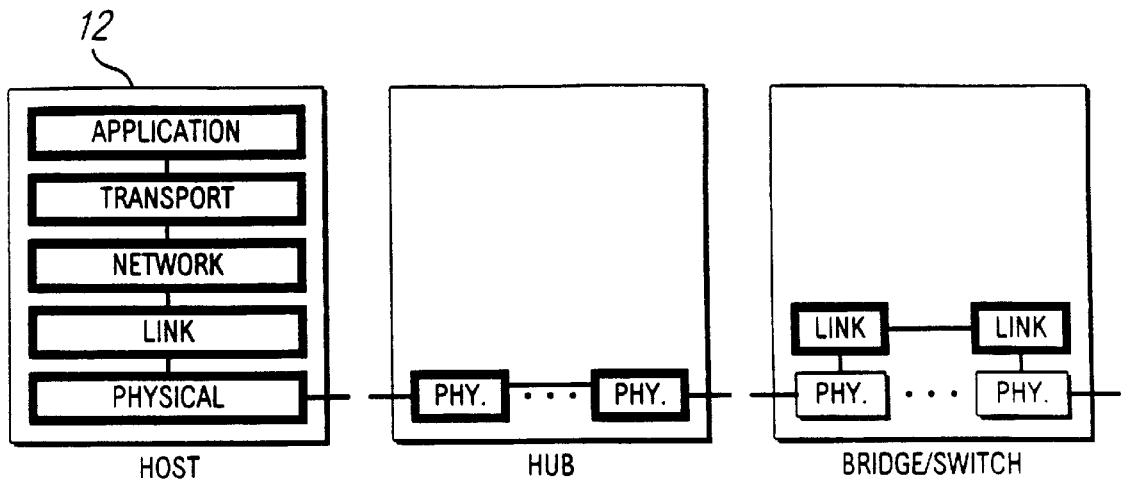
FIGS. 7a to 7g are diagrams illustrating protocol stack implementations for various network devices, and the translation function happening at all layers of the protocol stack in the nomadic router.

The present router operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 7a, host computers have to be configured at various layers of the protocol stack depending on the communication capabilities and configuration of the current network.

Hubs, as shown in FIG. 7b, provide a well defined interface to connect host computers and network devices by transmitting packets across multiple physical connections. Hubs do not provide any manipulation or translation of the content of the packets being transmitted.

Bridges or switches, as shown in FIG. 7c, provide an intelligent filtering mechanism by which they only transmit packets across multiple physical connections based upon which physical connection the device is connected to, according to the link layer addressing (Media Access Control Address). Bridges and switches do not manipulate the content of the packet and do not provide any higher layer protocol functionality.

Figures 7D, 7E, 7F:
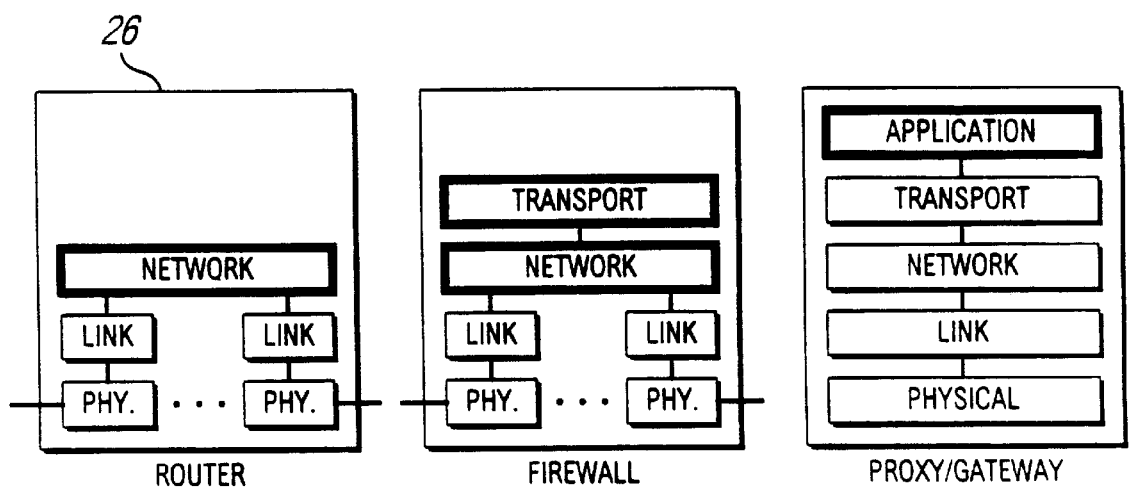

Routers, as shown in FIG. 7d, accept packets based upon the destination address at the network layer in the packet. The host computer must explicitly address the packet at the link layer to the router. The router will then retransmit the packet across the correct physical connection based upon how it is configured. No modification or translation of the packet is performed at any layer of the protocol stack other than the network layer.

Firewalls, as shown in FIG. 7e, filter packets at the network and transport layers to only allow certain packets to be retransmitted on to the other physical connection. Firewalls do not manipulate the content of the packet, only forward it on to the next hop in the network if it passes the transport (port) or network (IP address) filter.

Figure 7G:
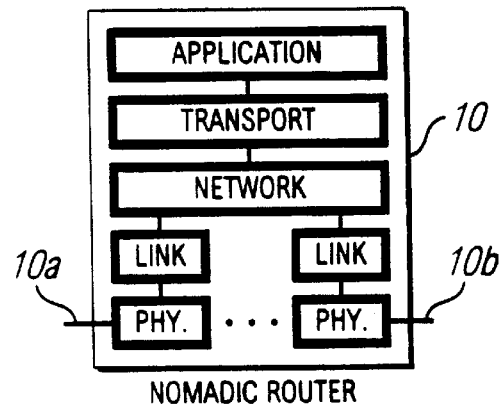

Proxys and gateways, as show in FIG. 7f, only receive packets explicitly addressed to them by host computers. They only manipulate packets at the application level. The present nomadic router 10, as shown in FIG. 7g, manipulates the content of the packets at the link, network, transport, and application layers of the protocol stack to provide a translation between how the host computer is configured and the configuration of the network to which the host computer is currently attached to.

Unlike all other devices shown in FIGS. 7a to 7f, the router 10 will automatically intercept and translate packets without the other devices being aware of the router 10 or being configured to use it. The translation algorithms in the router 10 which provide this location independence are provided completely internal to the router 10. Thus no new standards need to be developed, accepted, or implemented in host computers 12 or routers 26 to deploy new network services when using the nomadic router.

Whenever a new or different communication device (which includes the link and physical layers) is utilized in a host computer 12, the host computer's network layer must be aware of this new communication device. Since the router 10 has it's own network interface to the communication device, alternate communication devices can be utilized in the router 10 which the host computer 12 can utilize but does not have to be configured to use.

Permanent Addressing not Location Based

Today we communicate with individuals in terms of the location of their communications instruments (for instance, their computer's IP address or their fax machine's phone number). In order to support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

Figure 2:
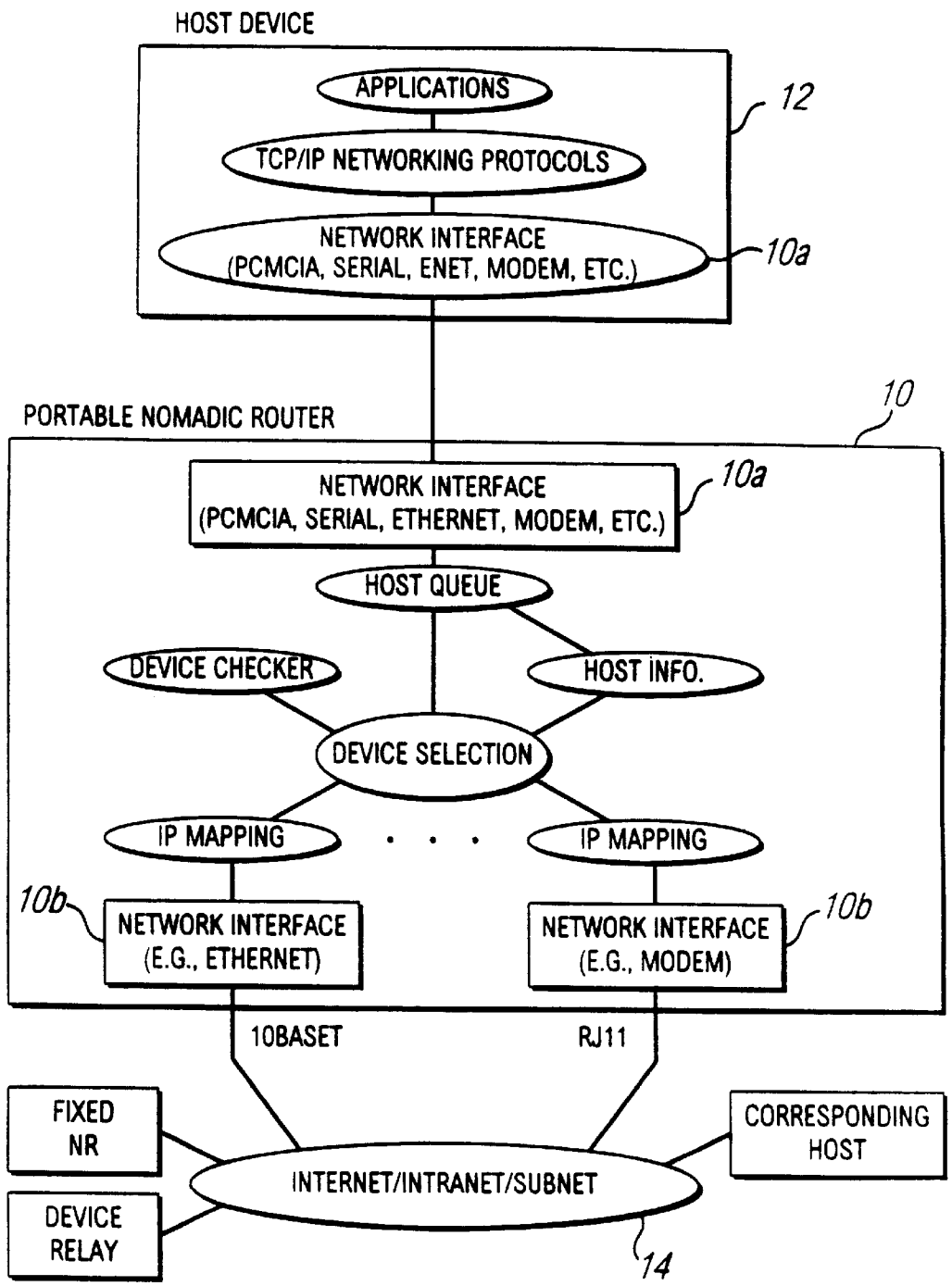
FIG. 2 is a diagram illustrating the basic nomadic router architecture, which is referred to as the hardware implementation architecture.

The present nomadic router 10 provides the mapping between the location based IP address used in the Internet today and the permanent user based address housed in the host CPU in the device 12. This is illustrated in FIG. 2 as "IP Mapping". This mapping is done without support or knowledge of such mapping by the host CPU or user.

Figure 3:
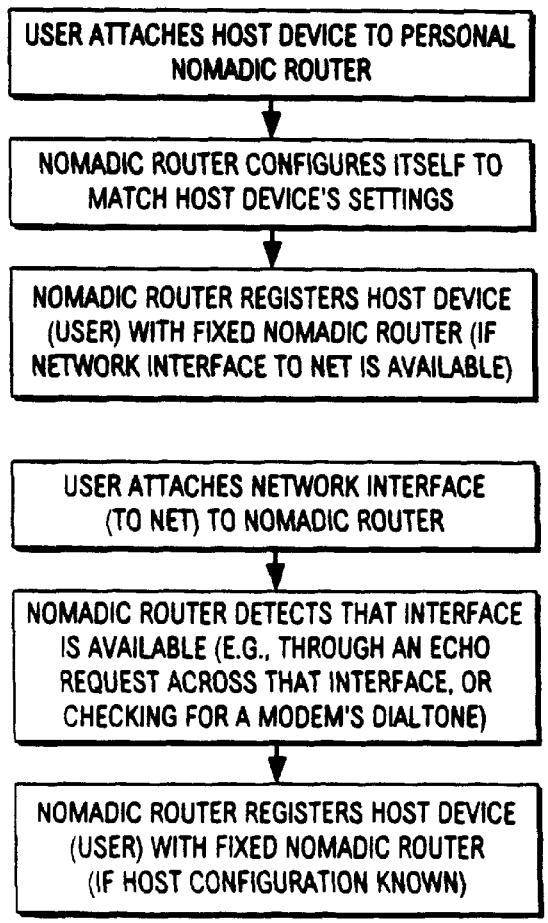
FIG. 3 is a flowchart illustrating a configuration overview of the basic steps performed when a host device is attached to the present nomadic router and when a network interface is attached to the router.
Figure 4:
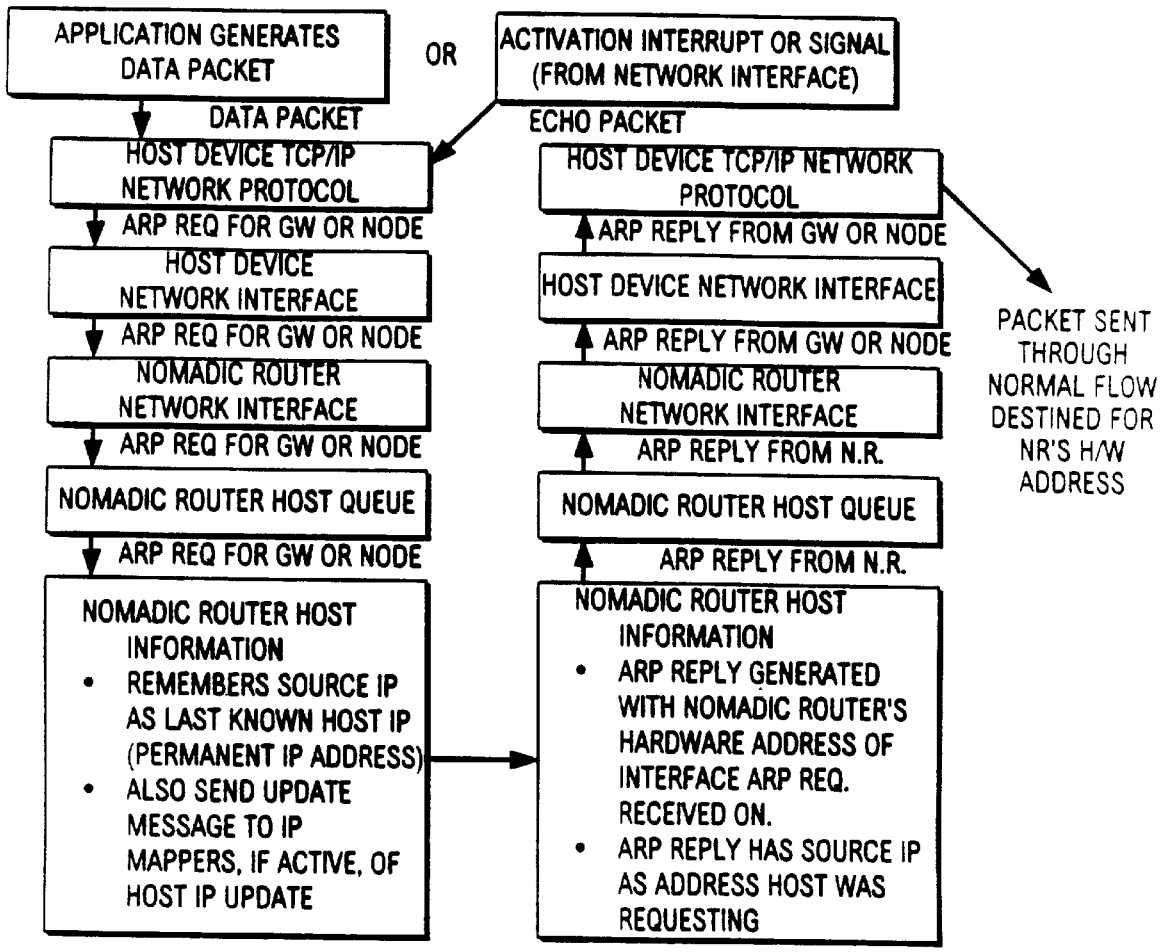
FIG. 4 is a flowchart illustrating the router's automatic adaptation to the host device when the first data packet from the host is sent to the attached router or when an activation interrupt or signal is received.

The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information such as its IP number are discovered or determined as illustrated in FIG. 4 and stored in the nomadic router 10 as illustrated in FIG. 2 as "Host Info." This configuration process is overviewed in FIG. 3.

Optional Off-loaded Processing

As illustrated in FIG. 2, the nomadic router 10 can provide off-load communication processing for the host CPU by being physically separate from the host device 12. The adaptation, selection, and transportation of information across the network is performed by the nomadic router 10. This allows the host terminal or device 12 to utilize the network without having to directly support the network protocols. By having the nomadic router be responsible for adapting to the current network substrate, the host CPU can maintain a higher performance by not having to run the routing, adaptation, packetization, etc. algorithms or packet processing.

The nomadic router can also queue, transmit, and receive data independent of whether or not the host device 12 is available or even attached. The CPU 11 built into the nomadic router 10 provides all necessary computing routines to be a fully functional network co-processor independent of the host CPU. This will allow increased battery for the user since the nomadic router does not have numerous user I/O devices as does the host device 12.

Location Independence

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network, node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services are restarted upon wakeup, and network applications get confused if they are not restarted. The nomadic router solves this problem by providing temporary as well as permanent network and node numbers similar to that provided by Mobile IP. However, the nomadic router will also work with other protocol stacks (e.g., AppleTalk).

Figure 5:
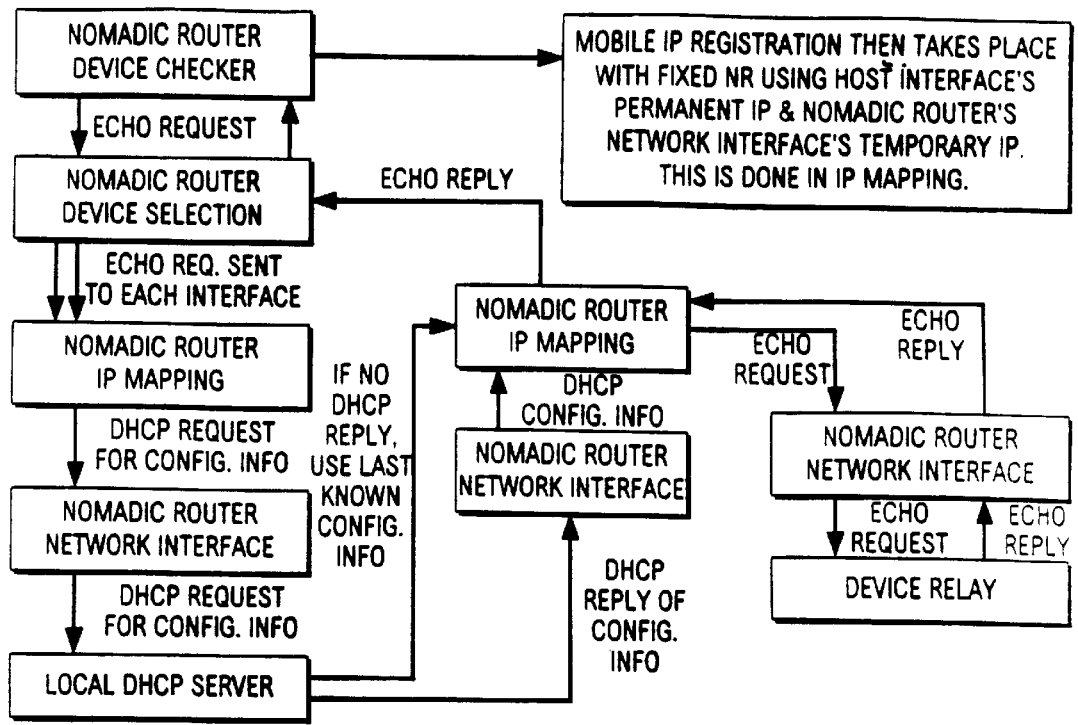
FIG. 5 is a flowchart illustrating the process by which the router initializes and checks the various communication device interfaces for initialization, activation, etc.

Mobile IP provides location independence at the network level and not at the link level. All link level parameters, which are device specific, will be automatically configured as illustrated in FIG. 5 when a new communications (network interface) device is attached to the nomadic router. The nomadic router completely eliminates the need for manual configuration by adaptively supporting device independence.

Multiple Substrates (Device Independence)

Another innovative feature of the nomadic router is the support for simultaneous use of multiple communication substrates. This is illustrated in FIG. 2 as "Device Selection". Users should be able to utilize two or more communication substrates, either to increase throughput or to provide soft-handoff capability. This functionality is not supported in today's typical protocol stacks (e.g., TCP/IP or AppleTalk).

For example, via the "network" control panel, the user can select between communications substrates such as EtherTalk, LocalTalk, Wireless, ARA, etc., but cannot remotely login across EtherTalk while trying to print via LocalTalk. Routers are typically able to bridge together various communication substrates, but merging the LocalTalk and EtherTalk networks together is often not desirable for many reasons, including performance and security.

A problem with existing routers today is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 2 and FIG. 5 as part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Another feature of the nomadic router is the support for alternate or simultaneous use of various communication substrates. This is performed as part of step 5 in FIG. 6 when the source address is that of the communication substrate that the nomadic router is going to send the packet out on. Host computers will now indirectly be able to utilize two or more communication substrates, either to increase throughput or to provide soft-handoff capability.

This functionality is not supported in today's typical protocol stacks (e.g., TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Hardware Specification

Figure 6:
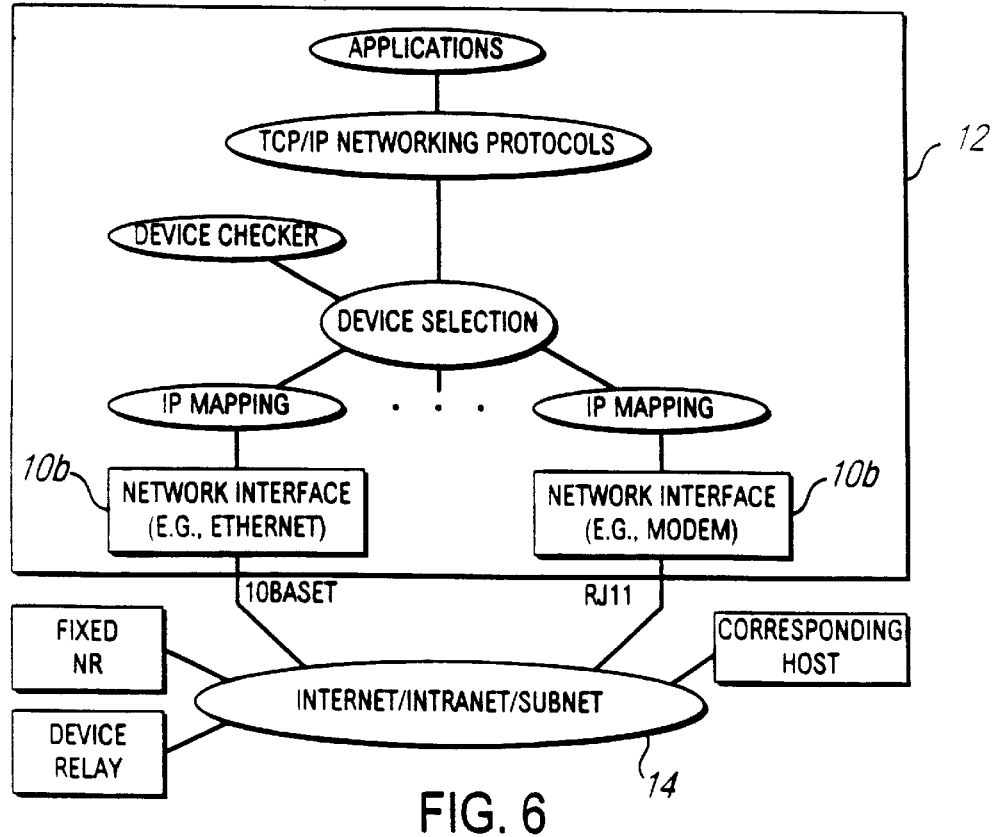
FIG. 6 is a diagram illustrating the basic nomadic router architecture when implemented as software in the host device.

The nomadic router can run completely in software without any special hardware as shown in FIG. 6, or without a CPU separate from the main host, or packaged in the form of a hardware device as shown in FIG. 2. The nomadic router can also be provided as a digital storage medium which stores the software program that implements the functionality of the router's translation processing. Examples of digital storage media include optical media (e.g. CD-ROM), magnetic media (e.g. floppy disks), nonvolatile or read-only memories, or any combination thereof. The program is loaded into and run on the mobile terminal 12, or alternatively into any other computer or router which is connected to a network.

One potential implementation of the nomadic router device is Embedded PC Technology. As an example, the rugged PC/104 standard modules have a form-factor of 3.550" by 3.775" and typically 0.6" per module and weigh approximately 7 oz. per module. The PC/104 module's utilization of a self-stacking bus with minimum component count and power consumption (typically 1–2 Watts per module) eliminates the need for a backplane or card cage.

The nomadic router can run on a 16 bit bus with an 80486 processor, for example. The standard network access devices can support burst rates up to 10 Mbps with typical user data throughput around 1–2 Mbps. The user bandwidth is less depending on the available wireless communication device. For example, Proxim's 2 Mbps wireless LAN typically covers 500 yards with user data throughput around 500 Kbps. As illustrated in FIG. 1, the nomadic router typically includes 3 modules; a processor 10, host device or terminal interface 10a, and communication device or system interface 10b.

Another potential hardware implementation is with the CARDIO S-MOS System technology. This CPU board is basically the same size as a PCMCIA credit card adapter. It is 3.55×3.775×0.6 inches. The power requirements are +5V DC+/−10% with an operating temperature of 0 to 70° C., a storage temperature of −40 to 85° C., and relative humidity of 10% to 85% non-condensing.

The CARDIO is the most compact PC/104 compatible system available which meets the one-stack mechanical and electrical PC/104 Rev. 2.2 specifications. Power fail indicator, battery backup and automatic switchover are also possible.

The nomadic router can also be implemented on a small portable device such as a PCMCIA card or partially on a PCMCIA card. In the case of a full implementation on a PCMCIA card, the host CPU and power supply are used to execute the Nomadic Routing and other protocols, algorithms, operating system, and application services. A hybrid implementation of part PCMCIA card and part other hardware implementation can also be used.

Apparatus Components

By performing packet translation in a self-contained apparatus, processing done on the packets in the nomadic router does not affect and is off-loaded from the host computer. All specific translation of the packets to match the network's configuration and services available is done internally to the nomadic router. The nomadic router can queue, transmit, and receive data independent of whether or not the host computer is available or even attached. The algorithms and microcontroller built into the nomadic router provides all necessary computing routines to be a fully functional network co-processor independent of the host computer.

By allowing the nomadic router to process packets independently of the host computer, the host computer can be powered down or asleep while processing is taking place, providing an increase in battery life for the mobile host computer.

Figure 10:
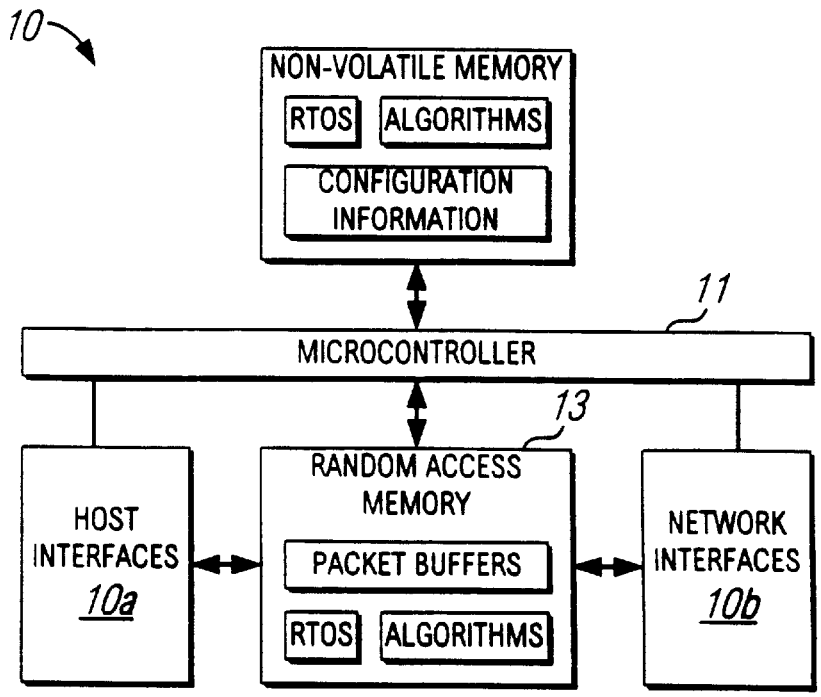
FIG. 10 is a diagram illustrating the architecture of the nomadic router implemented as a hardware device including a microcontroller and a non-volatile memory for storing algorithms implementing the translation function.

The nomadic router can be configured with various components in several different ways. In FIG. 10, the nomadic router contains a processor or microcontroller 11 to translate the packets stored in packets buffers in random access memory. The translation functions are stored in non-volatile memory 13 with the Real Time Operating System (RTOS) and configuration information on what types of translation need to be performed.

Upon startup (boot) of the nomadic router, the RTOS and translation algorithms are loaded from non-volatile memory into RAM where they are then executed. There may be zero, one, or more host interfaces in which host computers are connected. There are one or more network interfaces. If no host interface is available, then the nomadic router gets the packets via the host computer from the network interface.

Figure 11:
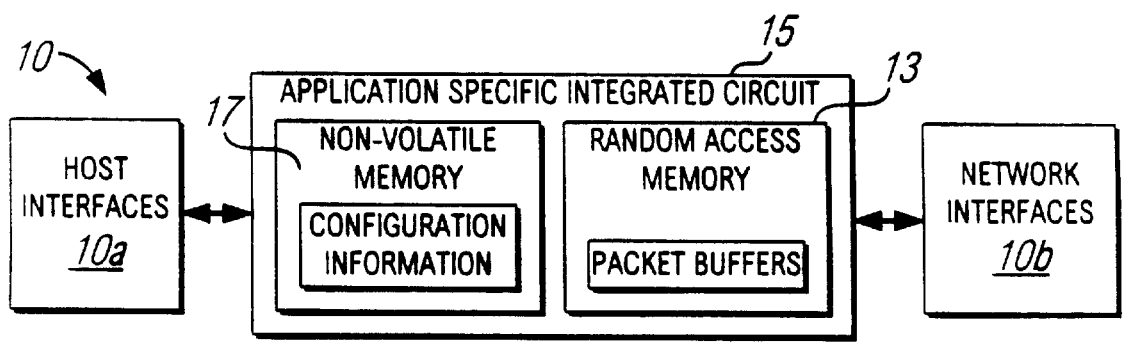
FIG. 11 is a diagram illustrating the architecture of the nomadic router apparatus implemented as an Application Specific Integrated Circuit (ASIC) chip.

In FIG. 11, the nomadic router 10 is implemented as an Application Specific Integrated Circuit (ASIC) or Field Programmable Gate Array (FPGA) 15. These chips embed the algorithms for packet translation. The chip can include storage for non-volatile memory 17 which stores the configuration information such as when manually configured for the current network. The chip 15 can also include random access memory to buffer packets for translation in the nomadic router before being sent off to the host or network interface.

Apparatus Packaging

As described above, the nomadic router can be packaged in several different hardware configurations. The nomadic router can be embedded in the host computer, or network device such as a switch or router. It can also be implemented as a PCMCIA card which plugs into the host computer or as a self-contained external box.

Figure 12A:
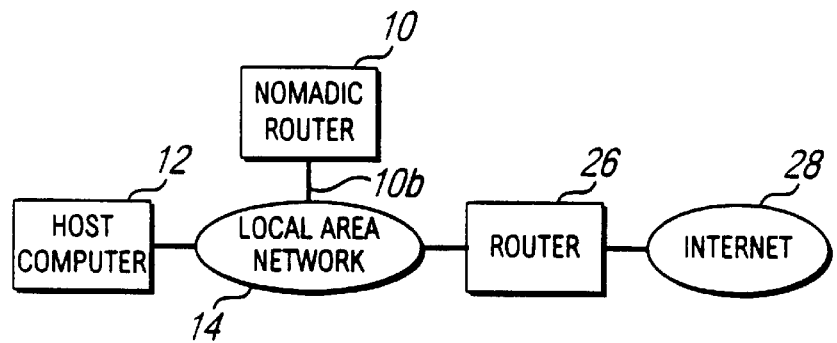
FIGS. 12a to 12d are diagrams illustrating host and network interface modes in which the nomadic router is able to operate.

Each nomadic router can have from one to many interfaces. If the router 10 is put into the network infrastructure, it doesn't have to be carried around with the mobile user. As shown in FIG. 12a, the nomadic router 10 is attached to a Local Area Network (LAN) of the network infrastructure which constitutes the communications device 14 through the system interface 10b. The LAN 14 is connected through a conventional router 26 to the internet 28. In this case, the host computer interface 10a of the nomadic router 10 is not needed since packets from the host computer 12 are received through the LAN 14.

Figure 12B:

To provide a secure interface between the host computer 12 and network 14 to prevent host computers from being able to watch (sniff) packets on the network 14, the nomadic router 10 can have one interface to the host computer 12 (terminal interface 10a) and a second interface (10b) to the network 14 as shown in FIG. 12b, and provide filtering of packets retransmitted between the various interfaces thus providing a firewall type of security device which operates internally on the network.

Figure 12C:
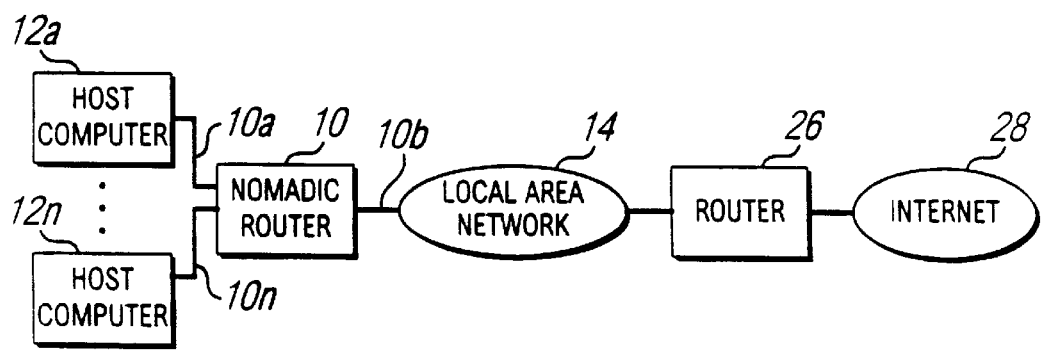
Figure 13:
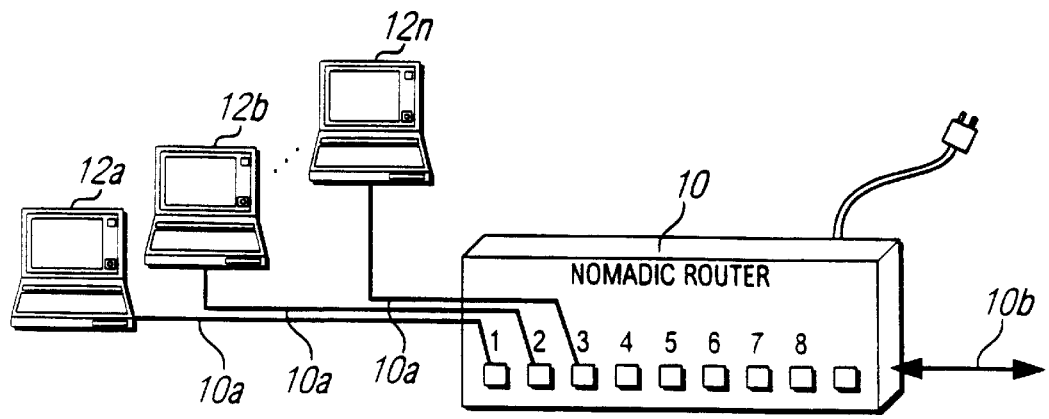
FIG. 13 is a simplified perspective view illustrating the nomadic router as implemented in a self-contained box which connects onto a local area network via a network interface port and has multiple ports to connect to host computers.

In order to support multiple host computers 12a . . . 12n with a single nomadic router 10, the nomadic router 10 may have multiple host interfaces $10a_1 \ldots 10a_n$ as shown in FIG. 12c and in FIG. 13 and a network or system interface 10b.

Figure 12D:
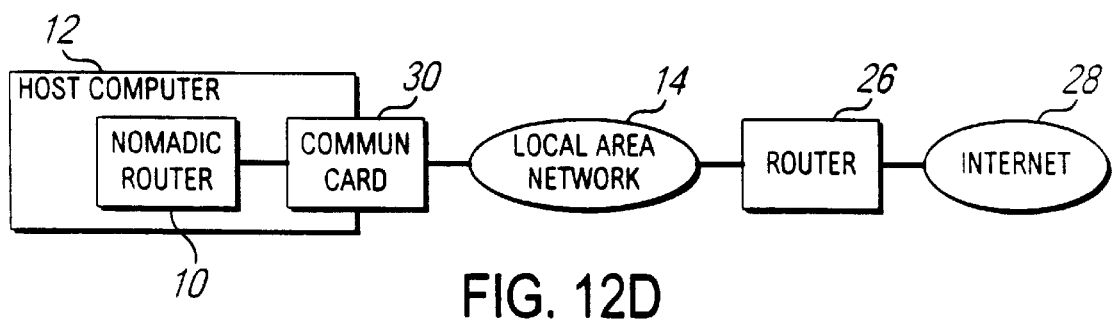

If the nomadic router is carried around by the mobile user, it can take the form of a PCMCIA card. In FIG. 12d, the nomadic router 10 is implemented as a PCMCIA card. The processing and translation capability is stored inside the card and the interface to the host computer 12 is through a PCMCIA BUS interface or communication card 30.

Figure 14:
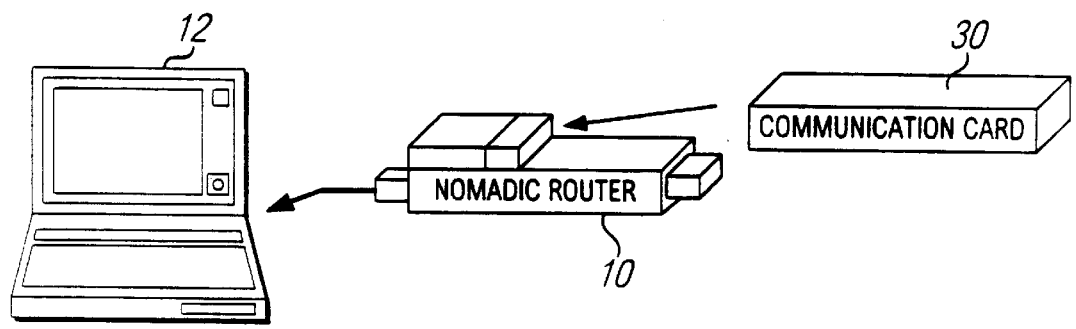
FIG. 14 is a simplified perspective view illustrating the nomadic router apparatus as implemented on a PCMCIA Type III card where the nomadic router plugs into the host computer's type II slot and the communication card device, of Type II, plugs directly into the nomadic router so both may be powered and stored in the portable host computer.

As shown in FIG. 14, the PCMCIA card can fit in a type III slot where there is a connector on the nomadic router 10 which accepts the communication card 30 (a type II PCMCIA card.) In this mode, the nomadic router does not have to have the communication device specific components inside the PCMCIA card.

Figure 15:
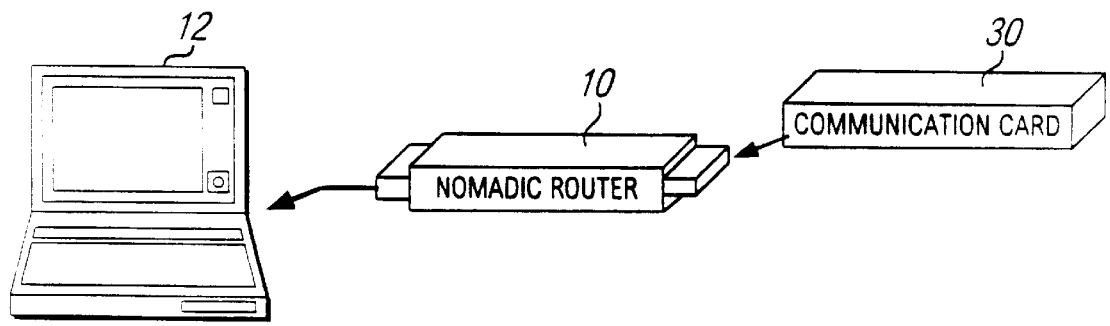
FIG. 15 is a simplified perspective view illustrating the nomadic router as implemented on a PCMCIA Type II card where the nomadic router plugs into the host computer via a type II interface slot and where the communication card device, Type II, plugs into the nomadic router type II card.

The nomadic router 10 can also take the form of a type II PCMCIA card. In this form, the communication device or card 30 plugs into the opposite end of the nomadic router card 10 as illustrated in FIG. 15.

Translation Operation of The Nomadic Router
Initialization and Self Configuration The nomadic router initialization and self configuration process provides the means by which the nomadic router is able to learn about the host computer and network so it knows what translation is necessary.

Host Learning

The nomadic router 10 is able to learn about how the host computer 12 is configured by looking at the content of the packets being sent from the host computer 12. Rather than the host computer 12 sending packets directly to the router 26 or other network device, which is what it is initially configured to do, the nomadic router 10 is able to redirect all outbound packets from the host computer 12 to itself. This redirection can be accomplished in several ways as described below.

1. Proxy ARP Packet Interception and Host Reconfiguration

Figure 8:
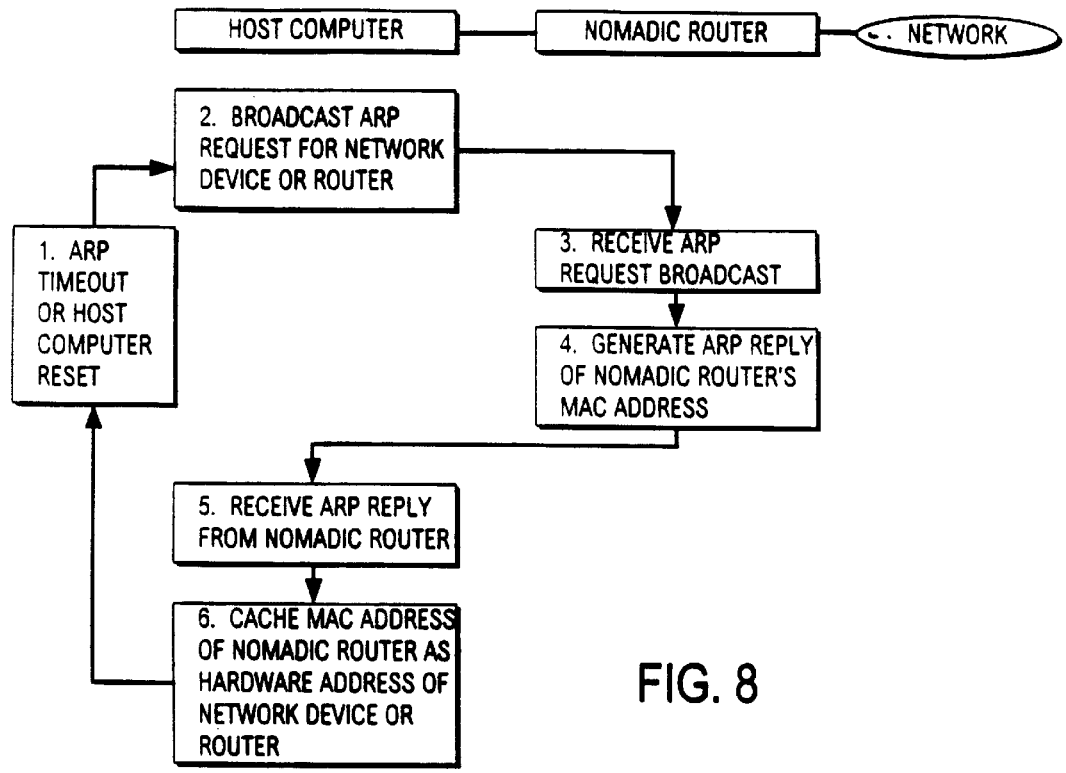
FIG. 8 is a flowchart illustrating the nomadic router's proxy ARP packet interception and host reconfiguration process.

Whenever a host computer 12 has an IP packet which it needs to send to a router 26 or other network device, it uses the Address Resolution Protocol (ARP) to obtain the link layer Media Access Control address (MAC address). As illustrated in FIG. 8, when the host computer 12 broadcasts an ARP request for the MAC address of a destination node, the nomadic router 10 receives this ARP request broadcast and responds with its MAC address (not that of the destination node).

When the host computer 12 receives this ARP reply from the nomadic router 10, which contains the MAC address of the nomadic router 10, the host computer 12 will cache this MAC address in the host computer 12 and send all packets destined for the configured router or network device to the nomadic router 10. The host computer 12 will think that the MAC address is that of the configured IP network device, but in reality, the nomadic router 10 is pretending (proxying) to be the device (its home gateway) that the host computer 12 expects to find.

The nomadic router 10 is also able to reconfigure and intercept return packets from a router or other network device using the same process.

2. Promiscuous Mode Packet Interception

Since the MAC address is cached in the host computer 12 for a short period of time, the host computer 12 will not send out a new ARP request to obtain the MAC address again unless a timeout period occurs or the cache is cleared such as when the computer 12 is restarted.

When a conventional network device receives or hears a packet with a MAC address which does not match its own, it will ignore or drop the packet. Since it is possible to rapidly switch from one network environment to another using a portable computer, the nomadic router 10 must be able to intercept packets even when the MAC address is not that of the nomadic router's home gateway or device.

This is accomplished by placing the nomadic router's network connection in promiscuous mode. In this mode, the network connection on the nomadic router accepts all packets being transmitted on the communication link, not just ones being broadcasted or addressed specifically to it.

3. Dynamic Host Configuration Protocol (DHCP) Service

A host computer is able to utilize the DHCP service to obtain the configuration information rather than being manually configured. The host computer utilizing the DHCP service requires that a DHCP server be installed on the network segment to which it is currently attached. If the host computer 12 is utilizing this service and requests configuration information using DHCP, the nomadic router 10 will intercept these requests and respond with configuration information for the host computer 12 to use.

Network Learning

The nomadic router is able to learn about the network environment it is currently attached using several different methods as described below.

1. Dynamic Host Configuration Protocol (DHCP)

Whenever a different network connection is connected on the nomadic router, it will broadcast a DHCP request to obtain configuration information for the current network. If no DHCP service is available on the network, it will switch to another method to learn about the network configuration.

2. Router Information Packets

Routers on the network will periodically broadcast router information packets which are used to build routing tables and allow routers to adapt to changes in the network. The nomadic router 10 will listen on the network for these router information packets. When one is received, it will extract out the configuration information from these packets.

3. Passive Listening

By placing the nomadic router's network connection in promiscuous mode, where it receives all packets not just ones destined for it, it is able to examine all packets on the network to discover how the network is configured. It is also able to determine the IP addresses used on the local area network and which machines are routers by the final destination address not being the next hop address.

Using this method, the nomadic router 10 is passively able to learn how the network is configured and will elect to use an unused IP address. If that IP address does become used by another network device, it will switch over to another unused IP address.

4. Manual Configuration

The network configuration information can be manually configured in the nomadic router 10. This information can be set using an embedded web server, Simple Network Management Protocol (SNMP) tools, an application running on one of the computers in the network, or other suitable means. When manual configuration is used to set the network information, the nomadic router 10 will still learn about the host information automatically and provide all the translation capabilities so the host computers do not have to be aware of the correct network information of the LAN to which they are currently connected.

Packet Translation

The nomadic router's packet translation function provides a mapping between location and service dependent configurations used by the host computer 12 and that used by the network 14 to which it is currently attached. For outbound traffic from the host computer 12 to the network 14, the translation function changes the content of the packet such as the source address, checksum, and application specific parameters, causing all packets sent out to the network 14 to be directed back to the nomadic router 10 rather than to the host computer 12.

The inbound traffic from the network 14 arriving at the nomadic router 10, which is really for the host computer 12, is passed through the translation function so the host computer 12 thinks that the replies were sent directly to it. The host computer 12 will be completely unaware of all the translation being performed by the nomadic router 10.

Figure 9B:
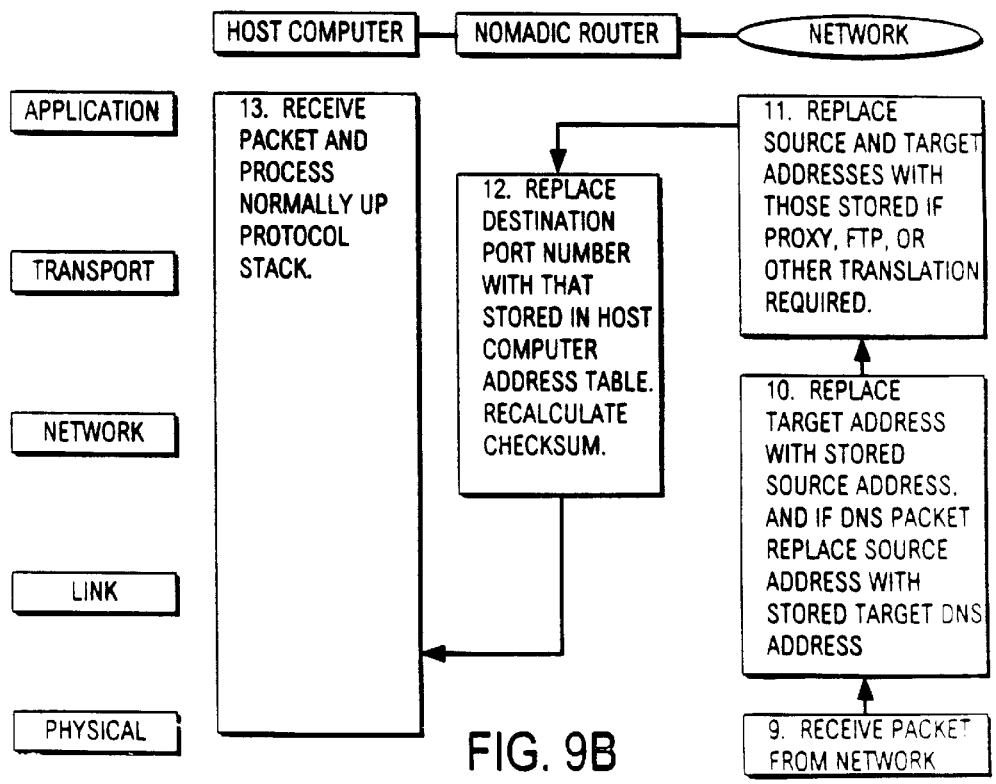
FIGS. 9a and 9b in combination constitute a flowchart illustrating the nomadic router's translation process which takes place in the host computer and nomadic router at various levels in the protocol stack.
Figure 9A:
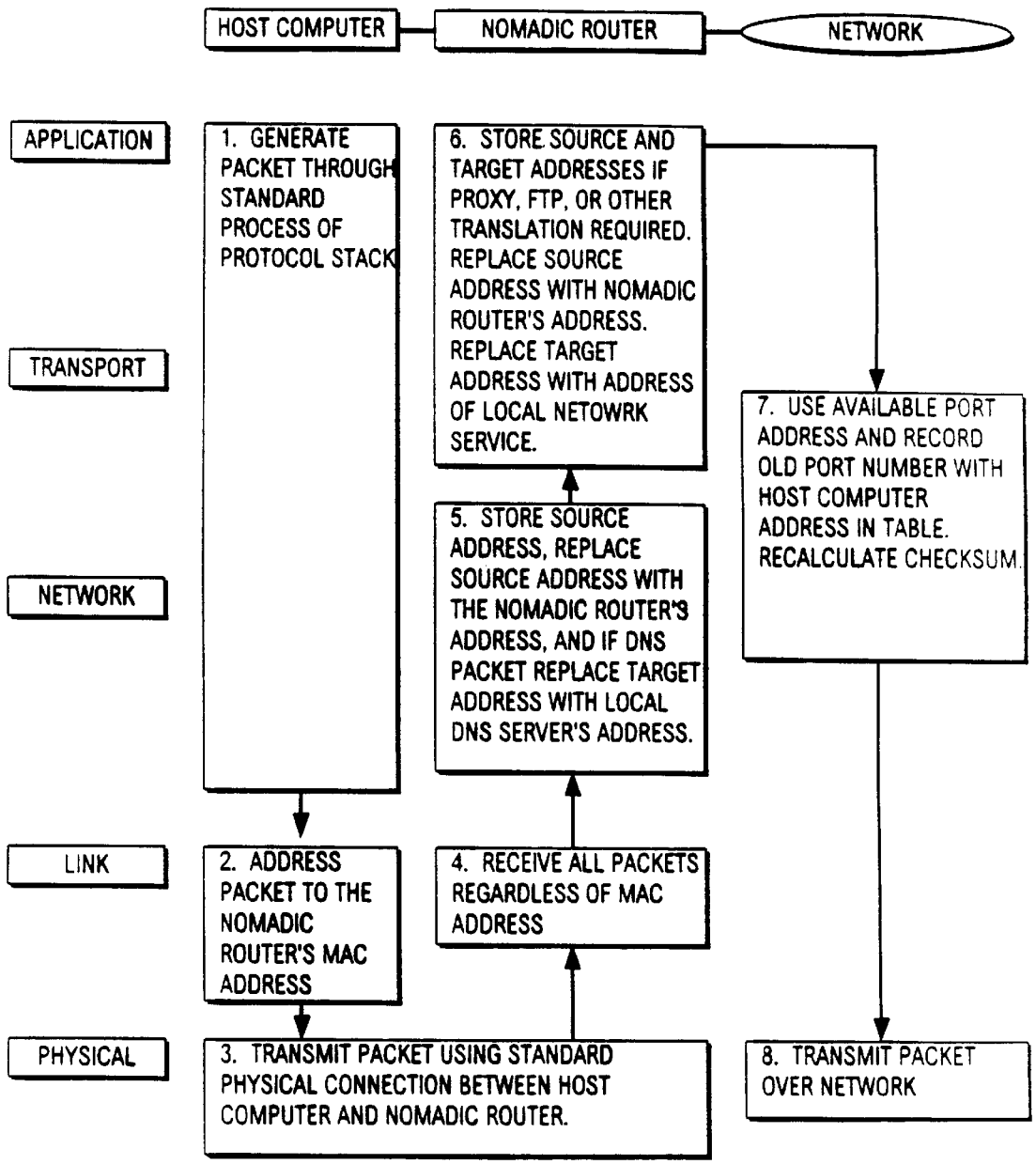

The translation function works as illustrated in FIGS. 9a and 9b. In these figures, the operations performed in the OSI/ISO model application, transport, network, link and physical layers are illustrated in rows opposite the layer designations. The operations performed by the host computer 12, nomadic router 10 and network 14 are illustrated in columns below the device designations.

The host computer 12 will generate network packets using the current configuration stored in the host computer 12 using the standard protocol stack as shown in step 1. This configuration information is either manually configured in the host computer 12 or obtained using DHCP.

As shown in step 2, when the host computer 12 addresses the link level destination address, the address automatically obtained using the Proxy ARP packet interception routine described earlier, this will cause the host computer 12 to send the packet to the network address of its standard router or home gateway device, but using the link level address of the nomadic router 10.

In step 3, the packet is transmitted across the standard physical connection between the host computer 12 and nomadic router 10. As shown in step 4, the nomadic router 10 will receive the packet at the link level either due to the Proxy ARP function which reconfigured the host computer's MAC address, or the nomadic router 10 will have the link level in promiscuous mode which will cause it to receive the packet even if destined to a different MAC address.

Once the packet is passed to the network layer, shown in step 5, the nomadic router translation function will modify the content of the packet to change the source address to that of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, since the transport layer requires a pseudo network layer header which includes the source and destination addresses and the content from the application layer.

At the application layer translation, any addresses which describe the source address of the host computer, such as with FTP, are translated to be that of the nomadic router's address. Any application layer destination addresses, such as a local proxy server, are translated to match that of the server running on the current network.

Once this application translation is complete, the transport layer, as shown in step 7, can complete the checksum and any port number manipulation. The port number is manipulated if more than one host computer 12 is attached to the nomadic router 10. Each host computer 12 when it sends out a request using a specific port is translated to match an available inbound port on the nomadic router 10.

The port number assigned for use with each host computer 12 is stored in a table in the nomadic router 10 and is utilized with the reply packet described later. Finally the packet is sent out over the network 14 in step 8.

When a reply packet comes in from the network 14, as shown in step 9, the nomadic router 10 will receive the packet. In step 10, the nomadic router 10 will perform the reverse network layer translation to set the destination address to that of the host computer 12 rather than the nomadic router's address, and any source address to that replaced by the nomadic router 10 in step 5.

Once this network translation is complete, the packet is translated at the application layer, as shown in step 11, to change the destination address to that of the host computer 12 and the source address to the original destination address stored from step 6. In step 12, any port manipulation performed in step 7 is changed to the original setting and a new checksum is computed. Finally, as shown in step 13, the packet is sent to the host computer 12 which then processes the packet normally.

Options of the Nomadic Router

There are numerous options and applications of the nomadic router. These applications include, but are not limited to, Nomadic E-mail, Remote Network File Synchronization, Nomadic Database Synchronization, Instant Network Nomadic Routing, Nomadic Intranets, and Trade Show Data Exchange. Each of these are described in more detail below.

Nomadic E-mail

Nomadic E-mail provides a synchronized yet distributed way for updates, reconciliation, and replicas to propagate through the internet. At various locations in the internet are nomadic router's equipped with nomadic E-mail support which provides the necessary synchronization, etc. Each nomadic router enabled for nomadic E-mail can utilize special protocols such as IMAP which provide support for mobile users without the host device having to support it (such as the case now with the POP3 protocol standard in most internet E-mail clients).

Remote Network File Synchronizer

The Remote Network File Synchronization option of the nomadic router provides copies of user files stored/cached at various locations (e.g., hotel, office, home) on other nomadic routers equipped for remote network file synchronization. Copies of updated files are automatically synchronized and distributed among all peer locations. Local updates can be made while the host is disconnected from the nomadic router and from the network.

Nomadic Database Synchronizer

The Nomadic Database Synchronizer houses the user's (synchronized) master databases (e.g., contacts, addresses, phone numbers). The nomadic router of the database synchronizer does not even need to be used on the network since it will interface directly with various host devices such as laptops, desktops, personal digital assistants, handheld personal computers, pagers, etc. via various standard ports.

Instant Network Nomadic Router

The objective of the Instant Network nomadic router is to enable rapid deployment of a communication network in any environment with little or no fixed infrastructure. The host and communication devices do not have to directly support the rapid deployment functionality.

The instant network nomadic router distributedly and intelligently establishes a wireless (or wired) communication link between the host device and the desired communication system while performing configuration, security, multihop routing, and network level data transmission over various communication devices. The nomadic router performs all the necessary network creation and processing automatically to remove configuration and system support from the host system or user. The instant network nomadic router utilizes proprietary and existing/emerging wireless communication systems, and multihop routing protocols.

By way of motivation, many communication infrastructures are varied and fragmented, and this problem is likely to be exacerbated as more technologies are introduced. For example, high performance LANs, wireless services, cellular telephony, satellite, ubiquitous paging networks, all provide varying degrees of coverage, cost and bandwidth/delay characteristics.

Sometimes there will be no connectivity at all because of lack of service, partial and intermittent connectivity as devices are plugged and unplugged from a system, damage to communication infrastructures deliberately or by accident, lossy communication as a system moves through various service areas or difficult domains, and times when multiple network devices (communication substrates) can be used at the same time. The instant network nomadic router will dynamically adapt the communication internetwork, dynamically creating one if necessary, to provide survivable communication in a mobile chaotic environment without the need for centralized control or fixed infrastructures.

The rapidly deployable nomadic router is a device associated with each user host device (e.g., PDA or laptop computer). It transparently provides the following capabilities for host computer systems using various wireless communication devices for physical and link layer access.

1. Dynamic wireless network creation
2. Initialization into existing wireless networks
3. Automatic configuration
4. Network and subnetwork level data transmission
5. Multihop routing functionality The nomadic router can detect a device being used either by polling the interface, providing an interrupt signal, or through specialized signaling. This in turn activates the nomadic router to configure the device (if necessary) and establish a communication link to an appropriate corresponding interface and wireless subnetwork. The nomadic router operates at a level between the host device generating data and the physical communication transmission device as illustrated in FIG. 1.

Nomadic Intranet

The Nomadic Intranet provides all network, server type, services for users who wish to dynamically create an adhoc network. This is similar to the instant network nomadic router except the nomadic intranet is a single device with multiple ports into which laptop/devices can be plugged. The instant network nomadic router is distributed to (one per) each host device. The nomadic intranet not only provides adhoc networking but can also provide services such as temporary file storage, protocol conversion, act as a print server, and provide other services described as part of the Basic nomadic router.

Trade Show Nomadic Router

The Trade Show nomadic router not only provides the basic nomadic router functionality for an exhibitor's computer that is brought to the show, but also provides lead capture and/or information distribution. Lead capture can be provided for by interfacing with a badge reader to read the attendee's information. This information is then captured by the nomadic router and made available in the exhibitor's lead database.

The nomadic router can also provide a mechanism for distributing information to the attendee's personalized web page or sent via e-mail directly across the internet. The exhibitor's computer is able to control the information flow with the nomadic router by running software, such as a web browser, which talks with the service/control software stored in the nomadic router. The standard web browser can control display and capture of lead information, collection of qualification information, and selection of information to be distributed back to the attendee.

Fixed Nomadic Router

The Fixed nomadic router provides the same basic functionality and architecture as the portable nomadic router but is stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

Mobile Virtual Private Network

The nomadic router provides the mapping between the location based IP address used in the internet today and the permanent user based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

Various modifications will become possible for those skilled in the art after receiving the teachings of the present disclosure without departing from the scope thereof.

Industrial Applicability

The present invention is broadly applicable to the field of electronic data communications using computers and other devices.

What is claimed is:

1. A method for allowing network communications over a foreign network for a user device configured to communicate with a home network, the method comprising:

connecting the user device to the foreign network;

intercepting packets transmitted from the user device which would otherwise be dropped by devices on the foreign network to determine without requiring prior knowledge of network settings of the user device;

using the determined network settings of the user device to determine whether to intercept subsequently transmitted packets; and automatically modifying packets transmitted from the user device based on the network settings of the user device and network settings of the foreign network.

2. The method of claim 1 wherein intercepting packets comprises:

intercepting an Address Resolution Protocol (ARP) packet transmitted from the user device to a network address on the home network; and replying to the ARP packet using the network address of the home device and a hardware address of a configuration translator such that subsequent packets generated by the user device are sent to the configuration translator.

3. The method of claim 1 wherein intercepting packets comprises:

operating in a promiscuous mode to intercept all packets without regard to a packet destination address; and determining the network settings of the user device based on a source address and destination addresses of the packets.

4. The method of claim 1 wherein intercepting packets comprises:

intercepting a Dynamic Host Control Protocol (DHCP) packet transmitted from the user device; and replying to the DHCP packet to provide configuration settings based on the foreign network configuration.

5. The method of claim 1 wherein modifying packets transmitted from the user device comprises:

replacing a source address with a router address where the router address is automatically determined based on the network settings of the foreign network.

6. The method of claim 5 wherein replacing the source address comprises replacing a source address within a packet header.

7. The method of claim 5 wherein replacing the source address comprises replacing a source address within a packet header and a source address within packet contents.

8. The method of claim 5 further comprising:

receiving data from the foreign network with the router address as a destination address; and replacing the destination address with a network address of the user device.

* * * * *

(12) EX PARTE REEXAMINATION CERTIFICATE (7203rd)
United States Patent
Short et al.

(10) Number: US 6,130,892 C1
(45) Certificate Issued: Dec. 1, 2009

(54) NOMADIC TRANSLATOR OR ROUTER

(75) Inventors: Joel E. Short, Los Angeles, CA (US); Leonard Kleinrock, Los Angeles, CA (US)

(73) Assignee: Nomadix, Inc., Westlake Village, CA (US)

Reexamination Request:
No. 90/007,423, Feb. 15, 2005

Reexamination Certificate for:
Patent No.: 6,130,892
Issued: Oct. 10, 2000
Appl. No.: 09/041,534
Filed: Mar. 12, 1998

Related U.S. Application Data

(63) Continuation-in-part of application No. 08/816,174, filed on Mar. 12, 1997, now abandoned.

(51) Int. Cl.
*H04L 29/06* (2006.01)
*H04L 29/12* (2006.01)

(52) U.S. Cl. .................. 370/401; 370/338; 370/466
(58) Field of Classification Search .................. None
See application file for complete search history.

(56) References Cited

U.S. PATENT DOCUMENTS

| | | |
|---|---|---|
| 5,166,931 A | 11/1992 | Riddle |
| 5,251,207 A | 10/1993 | Abensour et al. |
| 5,325,362 A | 6/1994 | Aziz |
| 5,410,543 A | 4/1995 | Seitz et al. |
| 5,425,029 A | 6/1995 | Hluchyj et al. |
| 5,442,633 A | 8/1995 | Perkins et al. |
| 5,490,139 A | 2/1996 | Baker et al. |
| 5,517,618 A | 5/1996 | Wada et al. |
| 5,539,736 A | 7/1996 | Johnson |
| 5,557,748 A | 9/1996 | Norris |
| 5,572,528 A | 11/1996 | Shuen |
| 5,608,786 A | 3/1997 | Gordon |
| 5,623,600 A | 4/1997 | Ji et al. |

(Continued)

FOREIGN PATENT DOCUMENTS

| | | |
|---|---|---|
| EP | 0 986 230 A2 | 3/2000 |
| JP | 5344122 A2 | 12/1993 |
| JP | 5-344122 | 12/1993 |

(Continued)

OTHER PUBLICATIONS

Network Working Group Request For Comments: 826;13 Ethernet Address Resolution Protocol (Nov. 1982).

(Continued)

*Primary Examiner*—Joseph R Pokrzywa

(57) ABSTRACT

A nomadic router or translator enables a laptop computer or other portable terminal which is configured to be connected to a home network to be connected to any location on the internet or other digital data communication system. The router automatically and transparently re-configures the terminal to its new location and processes outgoing and incoming data. The router includes a processor which appears as the home network to the terminal, and appears as the terminal to the communication system. The terminal has a permanent address, the router has a router or translator address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address. Alternatively, the terminal can be directly connected to a point on a local network, and the router connected to another point on the network. The router can be employed to implement numerous applications including nomadic e-mail, network file synchronizer, database synchronizer, instant network, nomadic internet and trade show router and can also be utilized as a fixed nomadic router.

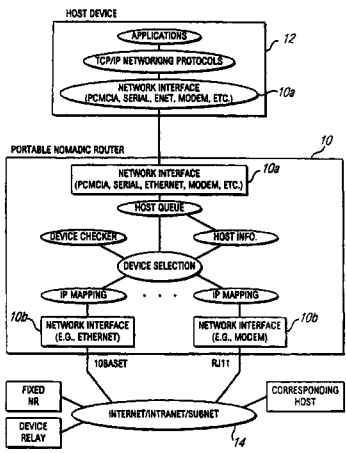

U.S. PATENT DOCUMENTS

| | | |
|---|---|---|
| 5,633,868 A | 5/1997 | Baldwin et al. |
| 5,636,216 A | 6/1997 | Fox et al. |
| 5,651,002 A | 7/1997 | Van Seters et al. |
| 5,708,780 A | 1/1998 | Levergood et al. |
| 5,757,924 A | 5/1998 | Friedman et al. |
| 5,761,683 A | 6/1998 | Logan et al. |
| 5,781,550 A | 7/1998 | Templin et al. |
| 5,802,320 A | 9/1998 | Baehr et al. |
| 5,812,531 A | 9/1998 | Cheung et al. |
| 5,812,776 A | 9/1998 | Gifford |
| 5,822,526 A | 10/1998 | Waskiewicz |
| 5,893,077 A | 4/1999 | Griffin |
| 5,910,954 A | 6/1999 | Bronstein et al. |
| 5,960,409 A | 9/1999 | Wexler |
| 5,963,915 A | 10/1999 | Kirsch |
| 5,987,430 A | 11/1999 | Van Horne et al. |
| 5,987,498 A | 11/1999 | Athing et al. |
| 5,991,292 A | 11/1999 | Focsaneanu et al. |
| 5,991,828 A | 11/1999 | Horie et al. |
| 6,014,698 A | 1/2000 | Griffiths |
| 6,055,243 A | 4/2000 | Vincent et al. |
| 6,061,356 A | 5/2000 | Terry |
| 6,061,668 A | 5/2000 | Sharrow |
| 6,088,725 A | 7/2000 | Kondo et al. |
| 6,098,172 A | 8/2000 | Coss et al. |
| 6,119,162 A | 9/2000 | Li et al. |
| 6,128,601 A | 10/2000 | Van Horne et al. |
| 6,128,739 A | 10/2000 | Fleming, III |
| 6,130,892 A | 10/2000 | Short et al. |
| 6,134,680 A | 10/2000 | Yeomans |
| 6,141,690 A | 10/2000 | Weiman |
| 6,205,481 B1 | 3/2001 | Heddaya et al. |
| 6,226,677 B1 | 5/2001 | Slemmer |
| 6,233,604 B1 | 5/2001 | Van Horne et al. |
| 6,243,379 B1 | 6/2001 | Veerina et al. |
| 6,249,527 B1 | 6/2001 | Verthein et al. |
| 6,286,039 B1 | 9/2001 | Van Horne et al. |
| 6,317,790 B1 | 11/2001 | Bowker et al. |
| 6,377,990 B1 | 4/2002 | Slemmer et al. |
| 6,385,653 B1 | 5/2002 | Sitaraman et al. |
| 6,393,468 B1 | 5/2002 | McGee |
| 6,412,073 B1 | 6/2002 | Rangan |
| 6,427,170 B1 | 7/2002 | Sitaraman et al. |
| 6,434,627 B1 | 8/2002 | Millet et al. |
| 6,460,084 B1 | 10/2002 | Van Horne et al. |
| 6,463,051 B1 | 10/2002 | Ford |
| 6,466,986 B1 | 10/2002 | Sawyer et al. |
| 6,496,850 B1 | 12/2002 | Bowman-Amuah |
| 6,535,493 B1 | 3/2003 | Lee et al. |
| 6,546,425 B1 | 4/2003 | Hanson et al. |
| 6,591,306 B1 | 7/2003 | Redlich |
| 6,636,894 B1 | 10/2003 | Short et al. |
| 6,640,251 B1 | 10/2003 | Wiget et al. |
| 6,671,379 B2 | 12/2003 | Nemirovski |
| 6,671,739 B1 | 12/2003 | Reed |
| 6,675,208 B1 | 1/2004 | Rai et al. |
| 6,779,118 B1 | 8/2004 | Ikudome et al. |
| 6,822,954 B2 | 11/2004 | McConnell et al. |
| 6,857,009 B1 | 2/2005 | Ferreria et al. |
| 6,868,399 B1 | 3/2005 | Short et al. |
| 7,051,087 B1 | 5/2006 | Bahl et al. |
| 7,088,727 B1 | 8/2006 | Short et al. |
| 7,139,268 B1 | 11/2006 | Bhagwat et al. |
| 7,313,631 B1 | 12/2007 | Sesmun et al. |
| 2002/0097674 A1 | 7/2002 | Balabhadrapatreun |

FOREIGN PATENT DOCUMENTS

| | | |
|---|---|---|
| JP | 7066809 | 3/1995 |
| JP | 8065306 A2 | 3/1996 |
| JP | 8-242231 | 9/1996 |
| WO | WO 95/27942 | 10/1995 |
| WO | WO 97/11429 | 3/1997 |
| WO | WO 99/039481 | 8/1999 |
| WO | WO 99/57866 | 11/1999 |

OTHER PUBLICATIONS

Network Working Group Request For Comments: 894—Standards For Transmission of IP Datagrams Over Ethernet Networks (Apr. 1984).

Network Working Group Request For Comments: 925—Multi–LAN Address Resolution (Oct. 1984).

Network Working Group Request For Comments: 1009—Requirements For Internet Gateways (Jun. 1987).

Network Working Group Request For Comments: 1027—Using ARP to Implement Transparent Subnet Gateways (Oct. 1987).

Network Working Group Request For Comments: 1034—Domain Names—Concepts and Facilities (Nov. 1987).

Network Working Group Request For Comments: 153—Dynamic Host Confirmation Protocol (Oct. 1993).

Network Working Group Request For Comments: 1919—Classical Versus Transparent IP Proxies (Mar. 1996).

Network Working Group Request For Comments: 1945—Hypertext Transfer Protocol—HTTP;1.0 (May 1996).

L. Kleinrock, "Nomadic Computing" (Keynote address) *Int'l Conf. on Mobile Computing and Networking*, 1995, Berkeley, California, ACM.

M. Baker et al., Supporting Mobility in MosquitoNet, Proceedings of the 1996 Usenix Technical Conference, San Diego, CA, Jan. 1996.

Comer, "Internetworking With TCP/IP vol. 1, Chapter 10, Principles, Protocols, and Architecture", $3^{rd}$ ed., Prentice Hall 1995.

Joel E. Short: "Auto–Porting and Rapid Prototyping with Application to Wireless and Nomadic Network Algorithms, A dissertation submitted in partial satisfaction of the requirements for the degree of Doctor of Philosophy in Computer Science", University of California, Los Angeles; Published Oct. 26, 1996; pp. xv, 118–124; Copyright Jan. 16, 1997.

Case No. 04CV1485 BTM (POR): *IP3 Networks, Inc. v Nomadix, Inc.*—Jul. 23, 2004 Complaint for: (1) Declaratory Judgment of Patent Non–Infringement and Invalidity of U.S. Patent No. 6,636,894; (2) Declaratory Judgment of Patent Non–Infringement of U.S. Patent No. 6,130,893; (3) Trade Libel; (4) Libel Under Cal. Civ. Code § 45; (5) Unfair Competition Under Cal. Bus.& Prof. Code § 17200, Et Seq.; and (6) Intentional Interference with Prospective Economic Advantage.

Case No. 04CV1485 BTM (POR): *IP3 Networks, Inc. v Nomadix, Inc.*—Sep. 20, 2004 Amended Complaint for: (1) Declaratory Judgment of Patent Non–Infringement and Invalidity of U.S. Patent No. 6,636,894; (2) Declaratory Judgment of Patent Non–Infringement of U.S. Patent No. 6,130,893; (3) Trade Libel; (4) Libel Under Cal. Civ. Code § 45; (5) Unfair Competition Under Cal. Bus.& Prof. Code § 17200, Et Seq.; and (6) Intentional Interference with Prospective Economic Advantage—Demand for Jury Trial.

Case No. 04CV1485 BTM (POR): *IP3 Networks, Inc. v Nomadix, Inc.*—Oct. 21, 2004 Answer and Counterclaims of Nomadix, Inc. to the Amended Complaint.

Case No. 04CV1485 BTM (POR): *IP3 Networks, Inc. v Nomadix, Inc.*—Plaintiff/Counter–Defendant IP3 Networks Inc.'s Reply to Defendant Nomadix, Inc.'s Counterclaim.

Perkins C.E et al.: "DHCP for mobile networking with TCP/IP" Proceedings IEEE International Symposium on Computers and Communications, Jun. 27, 1995, pp. 255–261, XP002132695.

Perkins C.E. Ed—Institute of Electrical and Electronics Engineers: "Mobile–AP, AD–HOC Networking, and Nomadicity" Proceedings of the 20th. Annual International Computer Software and Applications Conference (COMPSAC). Seoul, Aug. 21–23, 1996, Proceedings of the Annual International Computer Software and Applications Conference (COMPSAC), Los Alamitos, IEEE Comp, vol. Conf. 20, Aug. 21, 1996, pp. 472–576, XP 00684381, ISBN 0–8186–7579–9.

The Patent Office of the People's Republic of China Notification of First Office Action (PCT Application) and its translation for Chinese patent application 98 8 05023.4.

Google Groups: View Thread, Aug. 2, 2004, IP3 002505–06; Newsgroups: microsoft,public.win95.networking.

Google Groups: View Thread, Aug. 2, 2004, IP3 002507–10; Newsgroups: comp.os.os2.networking.tcp–ip.

Google Groups: network settings DHCP mobile, Aug. 3, 2004 IP3 002511–15; Newsgroups: comp.sys.mac.comm.

Google Groups: netswitcher; Aug. 2, 2004; IP3 002516; Newsgroups: comp.os.ms–windows.networking.win95.

Product Information—Netswitcher, the ultimate windows network setup utility; Aug. 2, 2004; IP 3 002517; Netswitcher™, Developed and Marketed by J.W. Hance, 1950–18 E. Greyhound Pass, Suite 305, Carmel, Indiana 46033 USA.

Google Groups: network laptop settings, Jul. 30, 2004; IP3 002767–68; Laptop on Dual Networks; Newsgroups: comp.os.ms–windows.nt.admin.networking.

Google Groups: network configuration laptop packets; Aug. 2, 2004 IP3 002765–66; Newsgroups: comp.protocols.tcp–ip.

Google Groups: "home network" laptop; Aug. 3, 2004; IP3 002769–70; Newsgroups: comp.sys.sun.admin. Newsgroups: comp.sys.sun.admin.

Google Groups: redirect "login page" Jul. 28, 2004; IP 3 002873–74; Newsgroups: microsoft.public.inetserver.iis.activeserverpages.

Yutaka Sato, "Details of Functions of Multi–purposeProxy Server DeleGate–Access/Route Control and Protocol Conversion", Interface vol. 21, No. 9, p. 130–146.

ATCOM/Info and Microsoft Plan Large–Scale Deployment of IPORT for Mid–1998, ATCOM–IPORT Press Release Mar. 4, 1998.

Hotel Online Special Report, Internet Access for the Road Warrior Easier Than Ever, IPORT™ Version 2.0 Released, ATCOM–IPORT Press Release Jul. 20, 1998.

Internet Access: ATCOM/Info Releases IPORT Central Office Solution. IPORT–CO Makes Plug & Play High–Speed Internet Access Possible too Multiple Properties from a Single Server–Product Announcement, ATCOM–IPORT Press Release Oct. 26, 1998.

Yutaka Sato, "Details of Functions of Multi–purpose Proxy Server DeleGate–Access/Route Control and Protocol Conversion", Interface vol. 21, No. 9, p. 130–146, Sep. 1995.

Nomadic Computing—An Opportunity, Kleinrock, Leonard, Computer Science Department, UCLA, Los Angeles, CA; This paper appears in: ACM SIGCOMM, Computer Communications Review, Publication Date: Jan. 1995, vol. 25, Issue: 1.

Nomadicity in the NII, Kleinrock, Leonard, Computer Science Department, UCLA, Los Angeles, CA; This paper appears in: Cross–Industry Working Team Papers & Reports, Publication Date: Jun. 1995.

Nomadic Computing, Kleinrock, Leonard, Computer Science Department, UCLA, Los Angeles, CA; This paper appears in: Information Network and Data Communications, IFIP/ICCC International Conference on Information Network and Data Communication, Publication Date: Jun. 1996, Location Trondheim, Norway.

Nomadicity: Anytime, Anywhere in a Disconnected World, Kleinrock, Leonard, Computer Science Department, UCLA, Los Angeles, CA; This paper appears in: Mobile Network and Applications, Special Issue on Mobile Computing and System Services, Publication Date: Dec. 1996, vol. 1, Issue: 4.

Review of Roaming Implementations, Aboba, B., Published as a RFC by ISOC, Sep. 1, 1997 UTC IP.com Document ID: IPCOM000002752D.

Network Layer Mobility: an architechture and survey Bhagwat, P. Perkins, C. Tripathi, S., Personal Communications, IEEE, Publication Date: Jun. 1996, vol. 3, Issue 3.

Classical versus Transparent IP Proxies (RFC1919), published as an RFC by ISOC on Mar. 1, 1996, M. Chatel.

Mobile IP–based multicast as a service for mobile hosts, Chikarmane, V., Dept. of Comput. Sci., Saskatchewan Univ., Saskatoon, Sask., Publication Date; Jun. 5–6, 1995.

A Virtual Home Agent Based Route Optimization for Mobile IP, Qiang Gao, Wireless Communications and Networking Conferences, 2000. WCNC. 2000 IEEE, Publication Date: Sep. 23–28, 2000, vol. 2.

Requirements for Policy–Based Management of Nomadic Computing Infrastructures, S. Heilbronner. Requirements for Policy–Based Management of Nomadic Computing Infrastructures. Proc. of the Sixth Workshop of the HP Openview University Association (HPOVUA'99), Bologna, Italy, Jun. 1999.

Automatically Configure a System to Route Internet Traffic to a Proxy, D. Liu, Originally disclosed by IBM on Apr. 1, 1999 UTC, RD v42 n420 04–99 article 42099.

Interactive Billing for Broadband and Multimedia Services Loeb, S., Community Networking, 1995. Publication Date: Jun. 20–22, 1995, Princeton, NJ.

AAA Protocols; Authentication, Authorization, and Accounting for the Internet, Metz, C. Internet Computing, IEEE, vol. 3, No. 6, pp. 75–79, Nov./Dec. 1999.

A Survey of Active Network Research, Tennenhouse, D.L. Smith, J.M. Sincoskie, W.D. Wetherall, D.J. Minden, G.J. Communications Magazine, IEEE, Publication Date: Jan. 1997, vol. 35, Issue: 1.

An Efficient Multicast Delivery Scheme to Support Mobile IP, Chu–Sing Yang, Database and Expert Systems Applications, 1999. Publication Date: Sep. 1–3, 1999.

A Mobile Networking System Based on Internet Protocol, Perkins, C.E., Bhagwat, P., Personal Communications, IEEE, Publication Date: 1st Qtr 1994, vol. 1, Issue: 1.

*Nomadix, Inc. v Second Rule LLC,* Civil Action No. 07–1946 DDP (VBKx), Expert Report of Peter Alexander, Ph.D. Regarding Invalidity of U.S. Patent Nos. 6,130,892; 6,636,894; 6,868,399; 7,088,727; 6,857,009.

TCP/IP Illustrated, The Protocols, vol. 1, W. Richard Stevens, pp. 53–62 and 231–235. 1994. ("Stevens").

"System Administration: IP Masquerading Code Follow–Up," Linux Journal archive, vol. 1997, Issue 43es, (Nov. 1997)ISSN:1075–3583, Chris Kostick ("Kostick97").

Building a Linux Firewall, Christ Kostick, Linux Journal 24, Apr. 1, 1996.

Linux as a Proxy Server, Linux Journal archive, vol. 1997, Issue 44 (Dec. 1997) Article 3, ISSN: 1075–3583, Peter Elton. ("Elton97") See http://portal.acm.org/citation.cfm?id=327077.327080.

IP Masquerading with Linux, Chris Kostick, Linux Journal Issue 27, Jul. 1996 ("Kostick96") See http://portal.acm.org/citation.cfm?id=328288.328289.

RFC 1009 Braden et al. "Requirements for Internet Gateways," Jun. 1987.

RFC 1027 "Using ARP to Implement Transparent Subnet Gateways," Carl–Mitchell et al, Oct. 1987.

RFC 1919, M. Chatel, Classical Versus Transparent IP Proxies, Mar. 1996.

Single–User Network Access Security TACAS+ http://www.cisco.com/warp/public/614/7.html IP3 002876–002884.

Building Internet Firewalls, D. Brent Chapman and Elizabeth D. Zwicky, O'Reilly & Associates, Inc., 103 Morris Street, Suite A. Sebastopol, CA 95472, IP3 002885–002944.

Internet Protocol, Darpa Internet Program, Protocol Specification, Sept. 1981, prepared for Defense Advanced Research Projects Agency, IP3 002945–002990.

Networking Working Group, Radius Accounting, Request for Comments: 21 39, Obsoletes: 2059; Category: Informational, C. Rigney, Livingston, Apr. 1997; IP 3 002991–003013.

U.S. Appl. No. 08/816,174, filed Mar. 12, 2997.

L Kleinrock, "Nomadic Computing" (Keystone address) *Int'l Conf. on Mobile Computing and Networking,* 1995, Berkeley, California, ACM.

M. Baker et al., Supporting Mobility in MosquitoNet, Proceedings of the 1996 Usenix Technical Conference, San Diego, CA, Jan. 1996.

Comer, "Internetworking With TCP/IP vol. 1, Chapter 10, Principles, Protocols, and Architecture," 3rd ed., Prentice Hall 1995.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *